United States Patent [19]

Muhr

[11] Patent Number: 4,773,129
[45] Date of Patent: Sep. 27, 1988

[54] HOSE CLAMP

[75] Inventor: Rudolf Muhr, Attendorn-Holzweg, Fed. Rep. of Germany

[73] Assignee: Muhr und Bender, Attendorn, Fed. Rep. of Germany

[21] Appl. No.: 104,115

[22] Filed: Oct. 1, 1987

[30] Foreign Application Priority Data

Oct. 2, 1986 [DE] Fed. Rep. of Germany ....... 3633486

[51] Int. Cl.⁴ ............................................. B65D 63/02
[52] U.S. Cl. .................. 24/20 R; 24/20 CW; 24/20 EE
[58] Field of Search ............ 24/20 R, 20 CW, 20 TT, 24/20 S, 20 EE, 21, 23 R, 23 EE, 23 W

[56] References Cited

U.S. PATENT DOCUMENTS

| | | | |
|---|---|---|---|
| 590,094 | 9/1897 | Duncan | 24/20 S |
| 1,379,476 | 5/1921 | Parr | 24/20 CW |
| 1,615,144 | 1/1927 | Singley | 24/20 TT |
| 2,472,172 | 6/1949 | Ovens et al. | 24/20 S |
| 2,629,908 | 3/1953 | Keck | 24/20 S |
| 4,319,385 | 3/1982 | Marchou | 24/20 R |
| 4,425,682 | 1/1984 | Hashimoto et al. | 24/20 R |
| 4,523,352 | 6/1985 | Wachter | 24/20 CW |
| 4,583,268 | 4/1986 | Horcherbornklöss | 24/20 R |
| 4,674,720 | 6/1987 | Fetsch | 24/20 EE |

FOREIGN PATENT DOCUMENTS 1055329 10/1953 France .
1177161 12/1958 France .
1560606 2/1980 United Kingdom ............... 24/20 R Primary Examiner—Victor N. Sakran
Attorney, Agent, or Firm—Browdy and Neimark

[57] ABSTRACT

A hose clamp (1) having a spring-loaded clamping body (2) encircling the end of the hose in a generally circular manner, and overlapping clamping ends (6, 7), where in the released state a defined inner diameter -clamping state- exists and the clamping body (2) can be spread to a considerably larger diameter against its inherent spring force by a spreading tool acting on the clamping ends (6, 7), which can be manipulated during operation without a special spreading tool because in the spread-open state of the clamping body (2) the clamping ends (6, 7) can be locked against each other and can be unlocked from each other for clamping a hose end.

6 Claims, 1 Drawing Sheet

2

HOSE CLAMP

The invention relates to a hose clamp having a spring-loaded clamping body encircling the end of the hose in a generally circular manner, and overlapping clamping ends, where in the released state there exists a defined inner diameter -clamping state, and the clamping body can be spread to a considerably larger diameter against its inherent spring force by means of a spreading tool acting on the clamping ends.

BACKGROUND OF THE INVENTION

Hose clamps of the type under discussion (see for example U.S. Pat. No. 4,583,268) are particularly intended and suitable for use in hose systems with medium internal pressures, for example for cooling systems of automotive vehicles where internal pressures of no more than 2 bar are expected under operating conditions. Customarily such hose systems are tested for up to 3 bar. The pressure-proof seating of a hose end on a connecting piece of such a hose system is assured by the elasticity of the hose end itself, which mostly is a rubber hose, a rubber/plastic hose with a fabric cover, etc., and also by the spring force of the hose clamp discussed above.

Thus the known hose clamp is not clamped by means of a separate clamping element, for example a clamping screw, in order to obtain the pressure-proof seating of a hose end on a connecting piece; instead the spring force of the correspondingly highly prestressed hose clamp assures pressure-proof seating. The force which needs to be exerted on the clamping ends of the hose clamp by a tool must be correspondingly great in order to spread the hose clamp against its inherent spring force to a considerably larger and mostly maximally limited diameter. This diameter must be sufficient to move the hose clamp easily across the hose end seated on the connection piece all the way to its intended position.

When installing a hose with the known and previously described hose clamp, the hose clamp is first gripped and spread with a spreading tool and is then pushed in its spread state onto the connection piece or on the hose end. During the entire installation which then follows the hose clamp must be kept spread open by means of the spreading tool. When the hose end has been pushed onto the connection piece and has been further pushed over a form-fitting circular bead possibly provided there, the spread-open hose clamp is moved to the intended position by means of the spreading tool, the spreading tool is detached and the hose clamp released. The hose clamp springs back in the direction of its released and clamping state, becomes attached to the hose end and clamps the latter onto the connection piece.

The above description of the installation with a known hose clamp makes it clear that one hand is required for manipulating the hose clamp with the spreading tool and another hand for the manipulation of the hose end itself. This plus the fact that the hose clamp can only be manipulated with a spreading tool and by bringing considerable spreading force to bear, causes problems in installation and other operational use.

SUMMARY OF THE INVENTION

Objects of the invention are to improve hose clamping and to improve the known hose clamp described above in such a way that it can be manipulated without a special tool and particularly can be manipulated by hand for clamping a hose end to a connection piece.

The hose clamp according to the invention by means of which the above identified objects are attained is characterized in that the clamping ends can be locked in respect to each other in the spread-open state of the clamping body and can then easily be unlocked from each other for clamping a hose end.

Thus the hose clamp is designed in accordance with the invention such that it can be brought into the spread-open state before application and remains in this state until it is used at the work place. This is made possible by the locking of the two clamping ends. When installing the hose clamp in a hose system of the type described above, the clamping ends of the hose clamp need to be unlocked only at the work place as soon as the hose clamp has been seated on the intended location on the connection piece. The hose clamp then springs back by itself into the clamping state as described above. It is important that a special spreading tool no longer is required for the use at the work place. At most it might be required to use a common tool, such as a screw driver or the like, to unlock the clamping ends.

The hose clamp according to the invention can also be manipulated particularly advantageously by hand. Furthermore, the hose clamp according to the invention can be used particularly advantageously in the course of the automated installation of hoses by means of industrial robots.

Other objects and the nature and advantages of the present invention will be more apparent from the detailed description of various preferred embodiments described below. They will be further explained below in connection with the invention by means of the drawings, wherein:

DETAILED DESCRIPTION OF THE PREFERRED EMBODIMENTS

Figure 1:
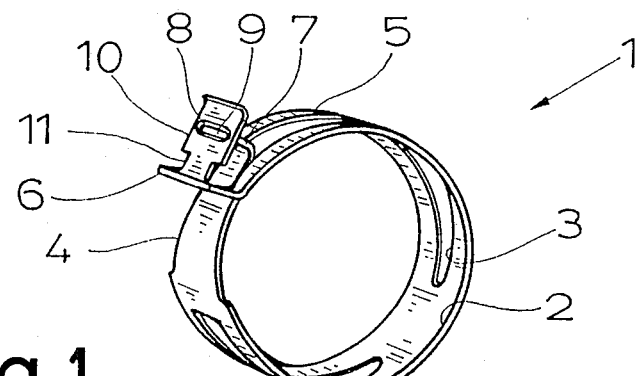
FIG. 1 shows in a schematic and perspective view a first exemplary embodiment of a hose clamp according to the invention in the spread-open state.

The hose clamp 1 shown in the drawings has a spring-loaded clamping body 2 for surrounding a hose end, not shown, in a generally circular manner. The clamping body 2 has a plurality of punched out holes 3, 4, 5 or, respectively, recesses to attain a defined spring characteristic or, respectively, to attain defined geometric conditions. Furthermore, clamping ends 6, 7 overlapping each other are formed on the clamping body 2. In the unlocked state the hose clamp 1 has an inner diameter smaller than the corresponding outer diameter of the hose end with which it is intended to be used, and can be spread open against its inherent spring force to a considerably larger diameter, i.e. a spread-open state, by a spreading tool, not shown, acting on the clamping ends 6, 7. The clamping ends 6, 7 can be disposed and-/or formed in such a way that they blockingly rest against each other when reaching a defined, maximally spread-open position. In any event, the hose clamp 1 snaps back into the direction of its clamping state under the influence of its inherent spring force as soon as it has been released from the spreading tool.

It is an important feature of the hose clamp 1 according to the invention that the clamping ends 6, 7 can be locked with each other in the spread-open state of the clamping body 2 and can be unlocked again for clamping a hose end. Thus it is important that initially the hose clamp 1 can be brought into the spread-open state such that the hose clamp 1 then retains this spread-open state on its own so that afterwards the spreading tool is no longer needed for the manipulation of the hose clamp 1. This means in particular that the hose clamp 1 according to the invention can be pushed onto a hose end, which is to be secured, without the use of a spreading tool at the work place and that then the clamping ends 6, 7 only need to be unlocked from each other when the desired position of the hose clamp 1 has been reached in order to return the hose clamp 1 into its clamping state again.

FIG. 1 shows an actual structure of the hose clamp 1 in which one clamping end 6 has a locking recess 8 and the other clamping end 7 has a locking projection 9 which can be lockingly inserted into the locking recess 8, by means of which the locking of the two clamping ends 6, 7 is realized. Other designs of locking recesses are conceivable for the same purpose, for example two locking hooks provided on one clamping end and laterally embracing the other clamping end. Also conceivable are, for example, surfaces of the overlapping clamping ends in the form of sawteeth. It is obvious that a number of designs can be found for locking together the clamping ends to force the clamp open against its natural spring biased released-clamped state.

Figure 2:
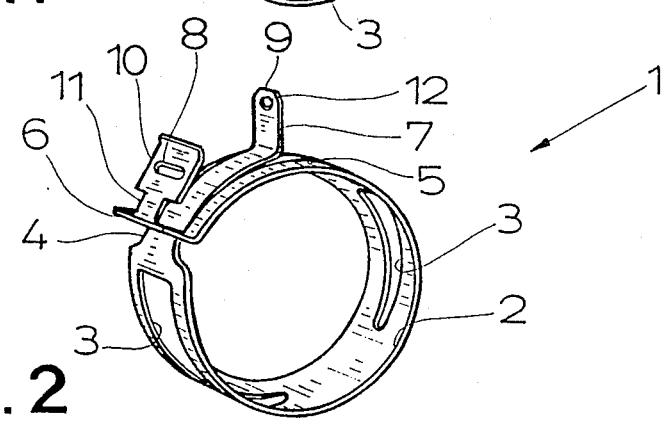
FIG. 2 shows the hose clamp of FIG. 1 in the clamping state in a view to FIG. 1.

When designing the locking together of the clamping ends 6, 7 by means of the locking recess 8 and the locking projection 9 it is suggested that the locking projection 9 in general extend radially away from the clamping body 2 and that it form the locking connection with an in general radially extending edge of the locking recess 8. A comparison of FIGS. 1 and 2 shows this very clearly. In this case it is practical that for locking, the locking projection 9 enter the locking recess 8 radially from the inside and particularly that the locking recess 8 be radially open to the outside; and that for the purpose of unlocking the locking projection 9 can be pushed from the outside generally in a radial direction inwardly through the locking recess 8. This feature proceeds from the realization that the spring force acting in the spread-open state of the hose clamp 1 is generally directed tangentially, so that a radial displacement of the locking projection 9 in respect to the locking recess 8 requires relatively little force. Thus the hose clamp 1 is especially easy to manipulate.

The drawings show an especially preferred embodiment of the invention in that the clamping ends 6, 7 are generally bent away radially from the clamping body 2 and preferably the locking projection 9 constitutes the end of a clamping end 7. In particular it is true for both cases, i.e. the exemplary embodiment in accordance with FIG. 1 and the exemplary embodiment in accordance with FIG. 3, that one clamping end 6 is formed in the shape of an inverted letter U and that the other clamping end 7 is formed in the shape of a projection and is disposed with its free end 9 approximately at the radial height of the bottom of the U the one clamping end 6 between the legs of the U.

It is shown in the drawings that in accordance with a further preferred feature of the invention one clamping end, in particular the clamping end 6 here in the form of an inverted letter U, may have a stop bar 10 generally extending towards the other clamping end 7 tangentially or in the form of a peripheral arc. In the exemplary embodiment of FIGS. 1 and 2 the stop bar 10 has been bent out of the material of the clamping end 6.

The constructions described above are very practical in a manufacturing sense and permit a cost-efficient production of the hose clamp 1 of the invention. In connection with these constructions it is advantageous to dispose the locking recess 8, if such should be present, in the stop bar 10.

Figure 3:
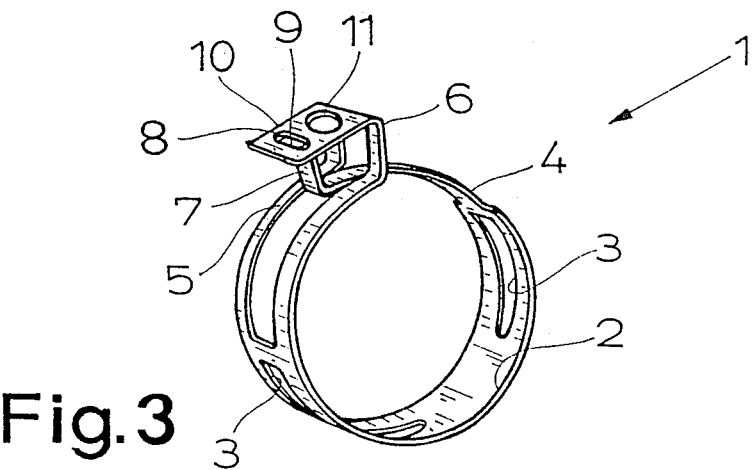
FIG. 3 shows a second exemplary embodiment of a hose clamp according to the invention in the spread-open state in a view similar to FIG. 1.

In connection with the above description, FIG. 3 shows a particular embodiment which is characterized in that the clamping end 6 in the form of an inverted letter U is in general radially bent away at a first bending location from the clamping body 2 and, particularly for the purpose of forming the stop bar 10, is bent back at a second bending location, which is at a distance from the first bending location, in the direction towards the other clamping end 7 generally tangentially or in the form of a peripheral arc in respect to the clamping body 2. In a practical manner the recess 5 in the clamping end 6 is drawn radially outwardly so that the clamping end 7, also extending radially outwardly, can enter through the recess 5 between the legs of the clamping end 6.

As shown in the drawings it is preferred that the two clamping ends 6, 7 be provided with manipulation projections and/or manipulation recesses 11, 12 for use with a tool not further shown. These manipulation projections and/or manipulation recesses 11, 12 can be used either for applying a spreading tool or an unlocking tool, for example when using the hose clamp 1 of the invention for the automated installation of hoses by means of industrial robots.

As the drawings show in detail, it is practical to provide the manipulation recesses 11 in the stop bar 10 in the one clamping end 6. This applies to the exemplary embodiment of FIG. 1. In the exemplary embodiment of FIG. 1 the manipulation recesses 11 may be disposed on the edge of the stop bar 10 in the one clamping end 6. In the exemplary embodiment in FIG. 3 the manipulation recess 11 is desirably in the form of a circular opening, particularly a bore, in the stop bar 10 in the one clamping end 6. Finally, in both exemplary embodiments the manipulation recess 12 at the other clamping end 7 is suitably disposed in the form of a circular opening, in particular a bore. It is obvious that although these forms of the manipulation recess 11, 12 are advantageous, they do not exclude other embodiments. For example, instead of the manipulation openings 11, 12, manipulation projections can be provided at the clamping ends 6, 7.

It will be obvious to those skilled in the art that various other changes and modifications may be made without departing from the scope of the invention and the invention is not to be considered limited to what is shown in the drawings and described in the specification.

What is claimed is:

1. A hose clamp (1) having a spring-loaded clamping body (2) for encircling and end of a hose in a generally circular manner and overlapping clamping ends (6, 7) bent radially outward from the clamping body (2),
    wherein in the released state a pre-determined inner diameter exists defining a clamping state, and the clamping body (2) can be spread to a considerably larger diameter against its inherent spring force by means of a spreading tool acting on the clamping ends (6, 7) to create a spread-open state, wherein the clamping ends (6, 7) are locked against each other in the spread-open state of the clamping body (2) and can be unlocked from each other for clamping of the hose end, wherein—seen in a sectional view along the axis of the clamping body (2)—one clamping end (6) is formed in the shape of an U with spaced legs and with the bottom of the U in a radially outward position, the other clamping end (7) being in the form of a projection and being disposed between the legs of the U of said one clamping end (6), the free end of the projection in radial direction being approximately aligned with the bottom of the U of said one clamping end (6), wherein the clamping end (6) in the form an U has a stop bar (10) extending towards the other clamping end (7) generally tangentially or in the form of a peripheral arch in respect to the clamping body (2), wherein, to define said stop bar (10), said clamping end (6) is bent away at a first bending location from the clamping body (2) in a generally radial direction and is bent back at a second bending location which is at a distance from the first bending location, wherein a locking recess (8) is disposed in the stop bar (10) and wherein the end of the other clamping end (7) is formed as a locking projection (9) entering the locking recess (8) in the stop bar (10) radially from the inside for locking.

2. A hose clamp in accordance with claim 1, wherein the locking recess (8) is radially open to the outside and the locking projection (9) can be pushed in general radially inwardly through the locking recess (8) for disengagement.

3. A hose clamp in accordance with claim 1, wherein the two clamping ends (6, 7) are provided with tool gripping means (11, 12) for applying a tool, the tool gripping means (11) in the one clamping end (6) being provided at the edge of the stop bar (10).

4. A hose clamp in accordance with claim 1, wherein the two clamping ends (6, 7) are provided with tool gripping means (11, 12) for applying a tool, the tool gripping means (11) in the one clamping end (6) being provided as a circular opening the stop bar (10).

5. A hose clamp in accordance with claim 1, wherein the two clamping ends (6, 7) are provided with tool gripping means (11, 12) for applying a tool, the tool gripping means (12) in the other clamping end (7) being formed by circular opening.

6. A one-piece hose clamp for clamping a flexible hose to a connecting piece, comprising a generally circular spring-loaded clamping body for encircling the end of the hose in a generally circular manner having overlapping first and second clamping ends, where in the released state a defined inner diameter clamping state exists, and the clamping body can be spread to a considerably larger diameter against its inherent spring force by means of a spreading tool acting on the first and second clamping ends;

said first clamping end defining a generally radially extending portion bent from said clamping body at a first bending location, and a generally tangentially extending portion bent back at a second bending location from said radially extending portion in the direction toward the second clamping end so as to define a generally U-shaped configuration when said hose clamp is viewed in the axial direction, said generally tangentially extending portion having a locking recess extending therethrough;

said first clamping end defining a generally inverted U-shaped central slot at least part of which extends through said radially extending portion, with said second clamping end projecting through said central slot of said first clamping end;

said second clamping end comprising a generally radially directed bent portion extending outwardly and having a locking projection at its end thereof, said locking projection of said second clamping end cooperating with said locking recess of said first clamping end to hold said hose clamp in the spread-open state.

* * * * *